United States Patent
Sedacca

(10) Patent No.: US 7,519,999 B2
(45) Date of Patent: Apr. 14, 2009

(54) SECURE NEGOTIATION AND ENCRYPTION MODULE

(75) Inventor: David A. Sedacca, Atlanta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 1155 days.

(21) Appl. No.: 10/789,337

(22) Filed: Feb. 27, 2004

(65) Prior Publication Data

US 2005/0190916 A1    Sep. 1, 2005

(51) Int. Cl.
*G06F 7/04*      (2006.01)
*H04K 1/00*     (2006.01)
*H04N 7/16*     (2006.01)

(52) U.S. Cl. .......................................... 726/26; 380/284
(58) Field of Classification Search ................... 726/26; 380/284
See application file for complete search history.

(56) References Cited

U.S. PATENT DOCUMENTS

| | | | |
|---|---|---|---|
| 5,742,677 A | | 4/1998 | Pinder |
| 5,870,474 A | | 2/1999 | Wasilewski |
| 5,937,067 A | * | 8/1999 | Thatcher et al. ............. 380/212 |
| 6,005,938 A | | 12/1999 | Banker |
| 6,105,134 A | | 8/2000 | Pinder |
| 6,157,719 A | * | 12/2000 | Wasilewski et al. ......... 380/210 |
| 6,223,285 B1 | * | 4/2001 | Komuro et al. ............. 713/160 |
| 6,246,767 B1 | | 6/2001 | Akins |
| 6,252,964 B1 | | 6/2001 | Wasilewski |
| 6,292,568 B1 | | 9/2001 | Akins |
| 6,424,714 B1 | | 7/2002 | Wasilewski |
| 6,424,717 B1 | | 7/2002 | Pinder |

(Continued)

FOREIGN PATENT DOCUMENTS

WO    WO 99/09743    2/1999

(Continued)

OTHER PUBLICATIONS

Crosby et al., A Cryptanalysis of the High-Bandwidth Digital Content Protection System, 2002, Springer-Verlag, DRM 2001 LNCS, pp. 192-200.*

(Continued)

*Primary Examiner*—Kambiz Zand
*Assistant Examiner*—William S Powers
(74) *Attorney, Agent, or Firm*—Edell, Shapiro & Finnan, LLC

(57) ABSTRACT

A digital subscriber communication terminal includes an adaptive output interface having a device key set, which, along with a subscriber device coupled to the adaptive output interface, determines a "shared secret." The adaptive output interface uses the "shared secret" to encrypt content and transmits the content to the subscriber device coupled to the adaptive output interface. The digital subscriber communications terminal includes a processor, a memory having an encrypted device key set and an encrypted device key set decryptor stored therein and a secure element having a key decryptor. The secure element is adapted to receive the encrypted device key set decryptor and use the key decryptor to decrypt the encrypted device key set decryptor. The device key set decryptor is provided to the processor, which decrypts the encrypted device key set using the device key set decryptor, and the device key set is loaded into the adaptive output interface.

24 Claims, 3 Drawing Sheets

U.S. PATENT DOCUMENTS

| | | | |
|---|---|---|---|
| 6,510,519 B2 | 1/2003 | Wasilewski | |
| 6,516,412 B2 | 2/2003 | Wasilewski | |
| 6,526,508 B2 | 2/2003 | Akins | |
| 6,560,340 B1 | 5/2003 | Akins | |
| 6,744,892 B2 | 6/2004 | Akins | |
| 6,937,729 B2 | 8/2005 | Akins | |
| 6,971,008 B2 | 11/2005 | Wasilewski | |
| 6,996,238 B2* | 2/2006 | Candelore | 380/278 |
| 7,184,550 B2* | 2/2007 | Graunke | 380/42 |
| 7,296,295 B2* | 11/2007 | Kellerman et al. | 726/26 |
| 2002/0002706 A1* | 1/2002 | Sprunk | 725/29 |

FOREIGN PATENT DOCUMENTS

WO    WO 02/052778    7/2002

OTHER PUBLICATIONS

Andreaux et al., Copy Protection System for Digital Home Networks, Mar. 2004, IEEE Signal Processing Magazine, pp. 100-109.*

Eskicioglu et al., Security of digital entertainment content rom creation to consumption, 2003, Singal Processing: Image Communication, Elsevier, pp. 237-262.*

Eskicioglu, Protecting Intellectual Property in Digital Multimedia Networks, Jul. 2003, IEEE, pp. 39-45.*

Ripley et al., Content Protection in the Digital Home, Nov. 2002, Intel Technology Journal, pp. 49-56.*

U.S. Appl. No. 09/111,958, filed Jul. 8, 1998, entitled "Mechanism and Apparatus for Encapsulation of Entitlement Authorization in Conditional Access System," Inventor: Defreese.

U.S. Appl. No. 11/464,421, filed Jun. 16, 2006, entitled "Securing Media Content Using Interchangeable Encryption Key," Inventor: Pinder.

U.S. Appl. No. 10/981,347, filed Mar. 25, 2003, entitled "Mechanism and Apparatus for Encapsulation of Entitlement Authorization in a Conditional Access System," Inventor: Defreese.

U.S. Appl. No. 11/428,367, filed Jun. 30, 2006, entitled "Secure Escrow and Recovery of Media Device Content Keys," Inventor: Schlarb.

U.S. Appl. No. 11/861,328, filed Sep. 28, 2007, entitled "Controlled Cryptoperiod Timing to Reduce Decoder Processing Load," Inventor: Pinder.

U.S. Appl. No. 11/781,412, filed Jul. 23, 2007, entitled "Preventing Unauthorized Poaching of Set Top Box Assets," Inventor: Murray.

U.S. Appl. No. 11/671,506, filed Feb. 6, 2007, entitled "Apparatus for Entitling and Transmitting Service Instances to Remote Client Devices," Inventor: Russ.

U.S. Appl. No. 11/829,674, filed Jul. 27, 2007, entitled "Secure Content Key Distribution Using Multiple Distinct Methods," Inventor: Pinder.

\* cited by examiner

SECURE NEGOTIATION AND ENCRYPTION MODULE

TECHNICAL FIELD

The present disclosure relates generally to cable television, and, more particularly, to a digital subscriber communication terminal adapted to transmit protected digital content to a subscriber device.

BACKGROUND OF THE DISCLOSURE

Subscriber television systems typically employ a receiver, or settop terminal, or digital subscriber communication terminal (DSCT), at each customer premises to receive and decode the programming transmitted to the user from a central location (commonly referred to in the industry as the "headend") via a wired infrastructure such as cable or wireless network. The digital subscriber communication terminal typically includes a receiver, decoder, and processing circuitry. The digital subscriber communication terminal is capable of receiving the programming information via the network and transforming the received signal to a format that can be presented to the viewer via a television display.

Today, subscriber television systems frequently transmit high quality digital content to DSCTs of their subscribers. Many subscribers have digital equipment such as personal computers that can be used to copy, virtually error free, digital content. In order to protect the property rights of owners of digital content, it is desirable to have a way to prevent uncontrolled copying of digital content received at the DSCTs.

BRIEF DESCRIPTION OF THE DRAWINGS

The preferred embodiment of the invention, as defined in the claims, can be better understood with reference to the following drawings. The components within the drawings are not necessarily to scale relative to each other, emphasis instead being placed upon clearly illustrating the principles of the present disclosure.

DETAILED DESCRIPTION OF THE PREFERRED EMBODIMENTS

Figure 1:
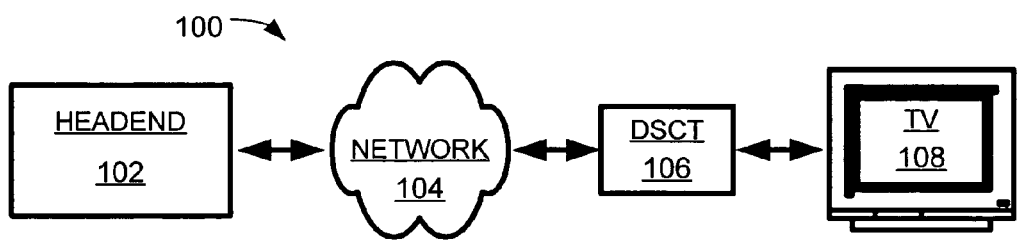
FIG. 1 is a block diagram illustrating the cable television system architecture, in accordance with one embodiment.

FIG. 1 is a block diagram illustrating the architecture of the subscriber television system (STS) 100 in which one preferred embodiment, among others, of the disclosure resides. Subscriber television system 100 includes central distribution point, or head end, 102 connected via network 104 to a digital subscriber communication terminal (DSCT) 106. Head end 102 is responsible for, among other things, program distribution and provides control functions to DSCT 106. The control functions include the assigning of program entitlements to the DSCT 106, i.e., granting the DSCT the authority to access programs.

Network 104 can be either a wired network or a wireless network. Wired networks include, among others, optical fiber networks, coaxial cable networks, and/or a combination of fiber and coaxial cable. Wireless networks include satellite networks and microwave networks, among others. Network 104 includes many intermediate devices (not shown) for two-way communication between the headend 102 and the DSCT 106. In-band communication is transmitted down stream over multiple quadrature amplitude modulation (QAM) channels from the headend 102 to the DSCT 106. Network 104 also includes a bi-directional quadrature phase shift keying (QPSK) communication channel over which control information is exchanged between the headend 102 and the DSCT 106. The exchange of information using the QPSK channel of network 104 is independent of the QAM channel to which the DSCT 106 is tuned.

The DSCT 106 receives digital content from the headend 102. Typically the digital content is encrypted using encryption techniques well known to those skilled in the art. U.S. patent entitled "Conditional Access System," U.S. Pat. No. 6,510,519, which is hereby incorporated by reference in its entirety, provides details on one acceptable example, among others, for encrypting and decrypting content in a subscriber television system. Among other things, in such an example, the DSCT 106 receives entitlements and long-term keys from the headend 102. The entitlements grant the DSCT the right to access selected digital content. If the DSCT 106 is entitled to access selected content, the long-term keys are used to decrypt encrypted content that the DSCT 106 is entitled to access. To access a particular program/service carried in the digital content, the DSCT 106 must have both, the correct entitlement for the particular program/service and the necessary long-term key.

The DSCT 106 provides digital content to a subscriber device 108 such as, but not limited to, a high definition television (HDTV) 108, digital audio equipment, and other devices adapted to receive digital content such as a digital recorder. Those skilled in the art will appreciate that in alternative embodiments the DSCT can be located in a variety of equipment, including, but not limited to, a computer, a TV, a monitor, or an MPEG decoder, among others.

Figure 2:
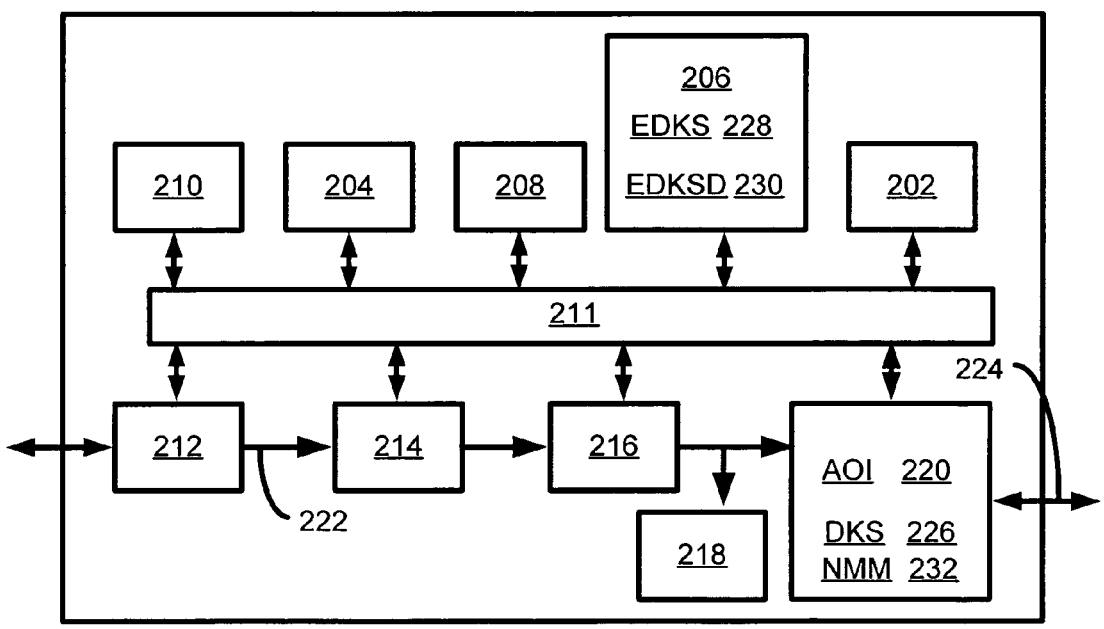
FIG. 2 is a block diagram illustrating a DSCT, in accordance with one embodiment.

Referring to FIG. 2, the DSCT 106 preferably includes a bus 211, a user interface 202, a processor 204, a memory 206, a secure element 208, a transceiver 210, a tuner 212, a demultiplexer 214, a cryptographic device 216, a converter 218, and an adaptive output interface (AOI) 220. User interfaces are well known to those of ordinary skill in the art; non-limiting examples of user interfaces include key pads and combined remote control/infrared detector pairs. A subscriber uses the user interface 202 to input commands such as selecting a "program channel". It should be noted that a digital program can be, and frequently is, carried along with other digital programs in a transport stream, and the transport stream is broadcast at a particular frequency over one of the QAM channels in network 104 as in-band communication from the headend 102 to the DSCT 106. In a cable network, a single analog program is transmitted at a specific frequency through a 6-megahertz wide frequency band. Digital programs on the other hand are compressible, and a single 6-megahertz wide frequency band can carry multiple digital programs. For the purposes of this disclosure, a "program channel" refers to a stream of digital content, which may or may not be multiplexed with other digital content. For the purposes of this disclosure, the digital content is described in terms of Motion Pictures Experts Group (MPEG) protocols, which are well known to those skilled in the art. However, MPEG content is used for illustrative purposes only and is a non-limiting example of digital content. Embodiments of the present invention are intended to encompass all forms of digital content.

Once a subscriber has selected a program channel, the processor 204 uses MPEG tables, such as network information tables and other system tables, which are stored in the memory 206, to determine the frequency band carrying the selected program channel. In addition to tables, the memory 206 also includes an encrypted device key set (EDKS) 228 and an encrypted device key set decryptor (EDKSD) 230, both of which are described in detail hereinbelow.

The transceiver 210 is used for two-way communication with the headend 102. The transceiver 210 receives out-of-band communication such as Entitlement Management Messages (EMMs) having, among other things, long-term keys and entitlements to services offered by the STS 100 included therein.

The processor 204 instructs the tuner 212 to tune to the frequency band carrying the selected program. The tuned to frequency carries a transport stream 222, and the tuner 212 provides the demultiplexer 214 with the transport stream 222. The demultiplexer 214 parses transport tables from the transport stream 222 and provides the transport tables to the processor 204.

Transport tables include conditional access tables (CATs), program association tables (PATs), and program map tables (PMTs), which are all well known to those of ordinary skill in the art. The transport stream 222 also includes entitlement control messages (ECMs) which are associated with an encrypted program. The entitlement control messages provide decryption information for the program to which they are associated, and the demultiplexer parses ECMs from the transport stream 222 and provides the ECMs to the secure element 208.

Using the transport tables the processor 204 instructs the demultiplexer to parse the selected program from the transport stream 222. The selected program is carried in a stream of packets, which are identified by packet identifiers (PIDs). The processor 204 determines the PIDs of the packets carrying the selected program, and the demultiplexer 214 passes received packets having matching PIDs to the cryptographic device 216.

The cryptographic device 216 receives a string of control words from the secure element 208. Each control word is used to decrypt a portion of the selected program. Typically, each control word in the string of control words is used to decrypt a minute or less of the program.

The cryptographic device 216 provides the decrypted output to the converter 218 and to the adaptive output interface (AOI) 220. The converter 218 converts the digital content from a digital format to a format for a non-digital subscriber device, such as an analog TV including analog stereo, or an analog stereo system, or a radio frequency (RF) output.

The AOI 220 is in two-way communication with the subscriber device 108 via communication link 224, and supports outputting content according to standards, such as, but not limited to, "digital video interface" (DVI), "digital transmission content protection" (DTCP), and "high band width digital content protection" (HDCP). A digital video interface (DVI) and an IEEE 1394 (firewire) interface are two non-limiting examples of interfaces used in the AOI 220.

In one embodiment, the AOI 220 is embodied in an ASIC. The AOI can be implemented in software, hardware, or a combination thereof. In another preferred embodiment, the AOI is implemented in software or firmware that is stored in a memory and that is executed by a suitable instruction execution system (microprocessor). If implemented in hardware, as in an alternative embodiment, the AOI can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

The AOI 220 includes a device key set (DKS) 226. Typically, the DKS 226 is loaded into the AOI 220 during the boot up of the DSCT 106. However, the DKS 226 can also be loaded into the AOI 220 as needed. The AOI 220 includes a network monitoring module (NMM) 232 that determines whether or not a subscriber device is coupled to the communication link 224. When the NMM 232 determines that a subscriber device is coupled to the communication link 224, the NMM 232 and the subscriber device establish communication using protocols well known to those skilled in the art such as, but not limited to, "Extended Display Identification Data (EDID)." Using information from the DKS 226, the NMM 232 determines whether the subscriber device is authorized to receive digital content.

An authorized subscriber device will include a device key set, which is typically provided to the device during its manufacture. An authority such as a consortium of digital content providers or a consortium of manufactures provide device key sets to "authorized" manufactures of digital subscriber devices. The "consortium" determines who is authorized to receive device key sets. Unauthorized manufacturers are not provided with device key sets. The consortium establishes protocols by which NMMs use device key sets to determine "shared secrets" and protocols for encrypting/decrypting content. Non-limiting examples of the protocols employed in NMMs include High-Bandwidth Digital Content Protection (HDCP), Digital Transmission Content Protection (DTCP), and OpenCable CableCARD Copy Protection System. Further details can be found in specifications such as HDCP revision 1.1, which can be downloaded at www.digital-cp.com and which is hereby incorporated by reference, and such as DCTP specification version 1.3, which can be downloaded at www.dtcp.com and which is also hereby incorporated by reference.

The AOI 220 communicates with the subscriber device 108, and together, using elements of the DKS 226 and corresponding information private to the subscriber device 108, they determine a "shared secret." The shared secret is then used in the encryption of digital content transmitted from the AOI 220 to the subscriber device 108. The shared secret can be used to encrypt the digital content, or alternatively, can be used to generate control words for encrypting the digital content. The digital content is encrypted using encryption algorithms well known to those skilled in the art such as, but not limited to, Data Encryption Standard (DES), triple Data Encryption Standard (3DES), among others.

Figure 3:
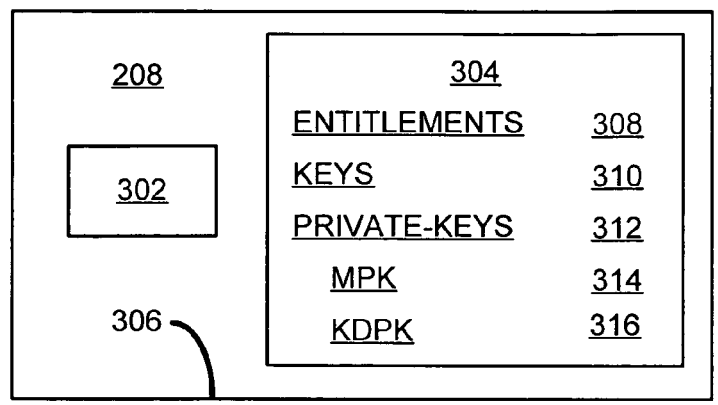
FIG. 3 is a block diagram of a secure element in a DSCT, in accordance with one embodiment.

Referring to FIG. 3, the secure element 208 includes a processor 302 and a memory 304, the processor 302 and memory 304 are enclosed in tamper resistant packaging 306, which protects the contents of the secure element 208 from unauthorized access.

The memory 304, which is only accessible to the processor 302, includes entitlements 308, keys 310, and private keys 312. Typically, the keys 310 include public-keys (asymmetrical) belonging to the headend 102 and symmetric keys, such as but not limited to, long term keys provided by the headend 102. The public keys are usually used for, among other things, verifying the digital signature of a message that has been signed with the corresponding private key. Public key/private key pairs are well known to those skilled in the art and shall not be discussed in detail. RSA is a non-limiting example of an encryption scheme employing asymmetrical public key/private key pairs. Briefly described, asymmetrical key pairs such as private-key/public-key pairs are used for encrypting and digitally signing content. Content encrypted by a public-key of a private-key/public-key pair can only be decrypted by the corresponding private-key. Content digitally signed with a private-key is verifiable with the corresponding public-key. Private-keys are kept private/secure, and public-keys are distributed. The symmetric keys included in keys 310 are generally used for, among other things, processing the content of an ECM to generate a control word.

The entitlements 308 map granted permissions to programs/services provided by the STS 100. For example, if a subscriber selects a given program such as pay-per-view movie, the processor 302 determines whether the DSCT 106 has been granted permission to access that particular program by checking the entitlements 308. The processor 302 generates the control words to decrypt the particular program, if and only if, the entitlements 308 indicate that the DSCT 106 has been granted permission to access the selected program. The secure element 208 receives from the demultiplexer 214 a string of entitlement control messages (ECMs), which are associated with the program, and the ECMs include a decryptor for generating control words associated with the selected program. The processor 302 determines whether the DSCT 106 is entitled to access the selected program using the entitlements 308, and if so, the processor 302 uses a long-term key from keys 310 to generate the control word using the decryptor included in the entitlement control messages. The control word is then provided to the cryptographic device 216.

The private keys 312 belong to the DSCT 106 and are never shared with any processor other than processor 302. The private keys 312 are provided to the memory 304 during the manufacture of the secure element 208, and the device that provided the private keys does not retain a copy of any of the private keys. The private keys 312 include a plurality of private keys such as a message private key (MPK) 314 and a key decryptor private key (KDPK) 316.

The headend 102 frequently sends messages such as entitlement management messages (EMM) to the DSCT 106 and frequently, the contents of the EMMs are encrypted by the public key corresponding to the MPK 314. The processor 302 uses the MPK 314 to decrypt the message content. Typically, EMMs include one of the keys 310 or instructions for the addition of an entitlement, or the removal of an entitlement, or deletion of one the keys 310. In that case, the EMM or selected portion thereof is provided to the secure element 208 by the processor 204. The processor 302 uses the MPK to decrypt the EMM (or portion thereof) and change the entitlements 308 or add or delete a key 310. Generally there is no observable output from the secure element 208 when an EMM or a portion of an EMM is processed.

Sometimes, the secure element 208 does output decrypted content. When it does so, the secure element 208 receives from the processor 204 a block of encrypted content and the processor 302 uses the KDPK 316 to decrypt the block. The decrypted block is then output to the processor 204. Generally, the decrypted block includes content matter and padding. The content matter is what was sought to be protected via encryption and the padding brings the total size of the block up to a desired size for encryption. Among other things, the KDPK 316 is used for decrypting the EDKSD 230.

In one preferred embodiment, during the manufacture of the DSCT 106, the secure element 208 is securely provided with the KDPK 316 by a key-granting authority. The key-granting authority retains a copy of the public-key corresponding to the KDPK 316 but does not retain a copy of the KDPK 316. The key-granting authority, which also has authority from the "consortium" to install device key sets in DSCTs, generates a key, a device key set decryptor (DKSD), and uses the DKSD key to encrypt a device key set, which is then stored in memory 206 as the encrypted device key set (EDKS) 228. The key-granting authority then uses the public-key corresponding to the KDPK 232 to encrypt the DKSD key, and the encrypted key is then stored in the memory 206 as the EDKSD 230. The key-granting authority then destroys its copy of the DKSD. Because the DSCT 106 is the only device having the private-key (KDPK 316), the DSCT 106 is the only device that can decrypt the EDKSD 230 and, therefore, the only device that can decrypt the EDKS 228.

In an alternative embodiment, the key-granting authority uses asymmetric keys to encrypt/decrypt the device key set. In that case, the key granting authority generates an encryption key for encrypting the device key set and a decryption key for decrypting the device key set. The key granting authority then encrypts the device key set, which is then stored in the memory 206 as the EDKS 228, using the encryption key and encrypts the decryption key using the public-key corresponding to the KDPK 316 of the DSCT 106. The encrypted decryption key is then stored in the memory 206 as the EDKSD 230. The key-granting authority does not retain a copy of the decryption key. Thus, the DSCT 106 is the only device that can decrypt the EDKSD 230.

Figure 4:
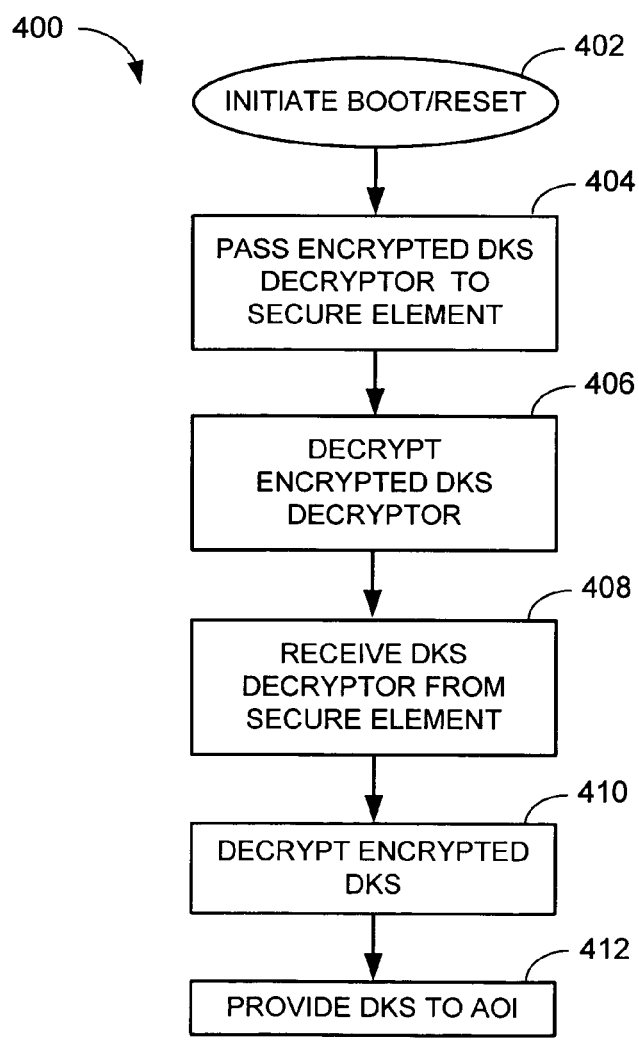
FIG. 4 is a flow chart illustrating a procedure to load a device key set, in accordance with one embodiment.
Figure 5:
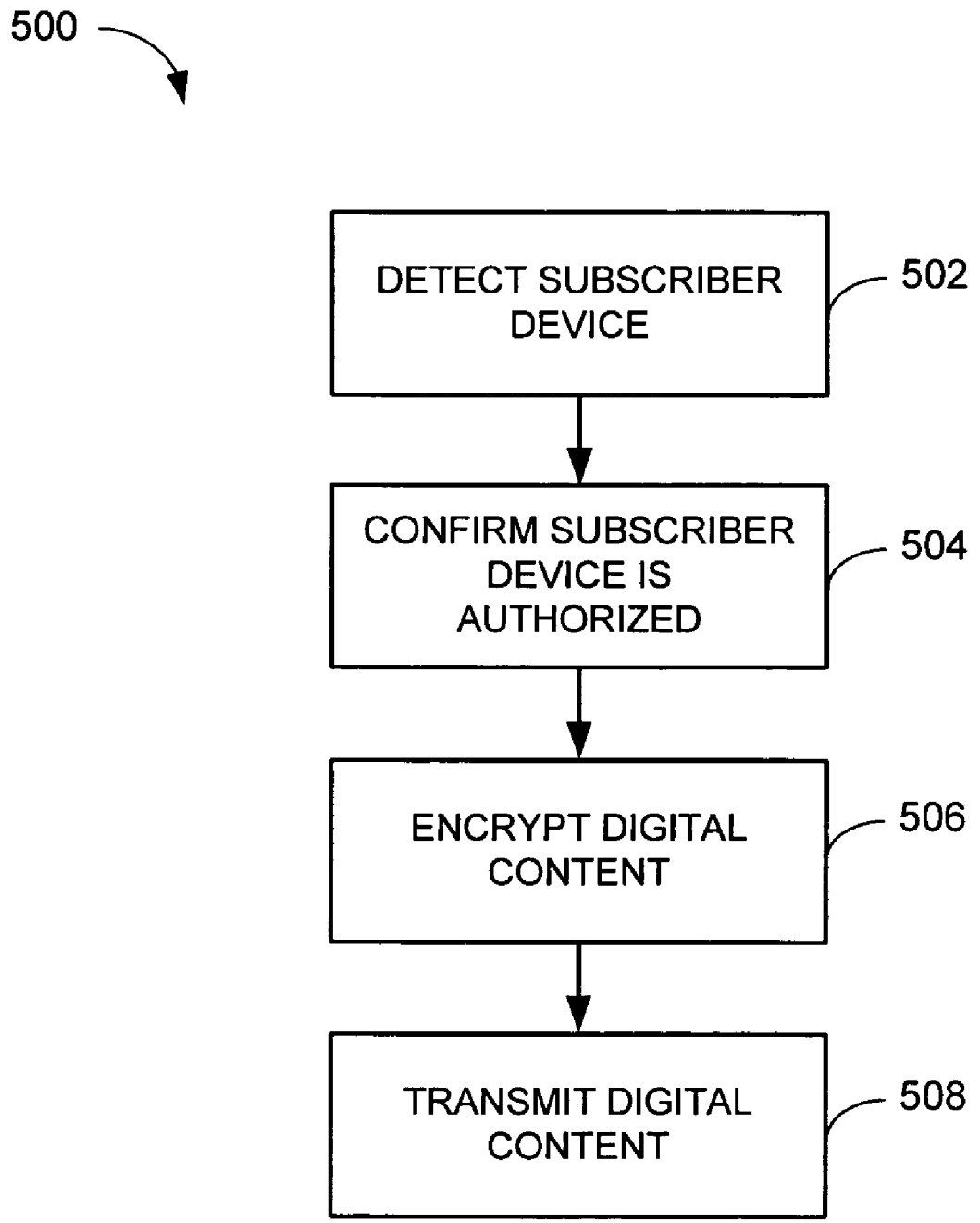
FIG. 5 is a flow chart illustrating a process of transmitting content to a subscriber device, in accordance with one embodiment.

FIGS. 4 and 5 are flowcharts illustrating various aspects of the operation of the DSCT 106. The flow charts of FIGS. 4 and 5 show the architecture, functionality, and operation of a possible implementation of the DSCT 106. In this regard, each block represents a module, segment, or portion of code, which comprises one or more executable instructions for implementing the specified logical function(s). It should also be noted that in some alternative implementations, the functions noted in the blocks might occur out of the order noted in FIGS. 4 and 5. For example, two blocks shown in succession in FIGS. 4 and 5 may in fact be executed substantially concurrently or the blocks may sometimes be executed in the reverse order, depending upon the functionality involved, as will be further clarified hereinbelow.

The logic of the preferred embodiment of the disclosure can be implemented in software, hardware, or a combination thereof. In a preferred embodiment(s), the logic is implemented in software or firmware that is stored in a memory and that is executed by a suitable instruction execution system (microprocessor). If implemented in hardware, as in an alternative embodiment, the AIO, NMM, and device key set can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Furthermore, the software, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a fixed computer disk (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note, the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Referring now to FIG. 4, the DSCT 106 implements the steps 400 to, among other things, load the DKS 226 into the AOI 220. In step 402, the DSCT 106 is initialized by booting or resetting the operating system of the DSCT 106.

In step 404, the processor 204 passes the EDKSD 230 to the secure element 208, and in step 406, the processor 302 uses the KDPK 316 to decrypt the EDKSD 230 and generate a device key set decryptor (DKSD).

In step 408, the DKSD is passed from the secure element 208 to the processor 204.

In step 410, the processor 204 decrypts the EDKS 228 using the DKSD. Typically, the EDKS 228 was encrypted using symmetric encryption algorithms such as, but not limited to, DES or 3DES. It should be noted that the processor 204 is adapted to decrypt the EDKS 228 using the DKSD regardless of whether the EDKS 228 was encrypted using a symmetric encryption algorithm or an asymmetric algorithm.

Next, in step 412, the processor 204 provides the DKS 226 to the AOI 220.

In an alternative embodiment steps 404-412 are not initiated upon initialization of the DSCT 106. Rather, the AOI 220 includes plug-n-play capabilities such that the AOI 220 can detect the subscriber device through communication link 224 responsive to the subscriber device 108 being coupled to the AOI 220. After detecting the subscriber device 108, the AOI 220 signals the processor 204, which then implements steps 404-412.

Referring to FIG. 5, steps 500 illustrate steps taken by the AOI 220 to provide the subscriber device 108 with digital content. In step 502, AOI 220 detects the subscriber device 108. The AOI 220 and subscriber device 108 includes the necessary logic for implementing protocols such as plug-n-play for communicating over communication link 224.

In step 504, the AOI 220 uses elements of the device key set 226 to determine a shared secret with the subscriber device 108. The shared secret is only determined if the subscriber device 108 is authorized by the "consortium" to receive digital content because only authorized subscriber devices have a compatible device key set.

In step 506, the AOI 220 uses the shared secret to encrypt the digital content. The shared secret may be used as a key for encrypting the digital content or the shared secret may be used to generate an encryption key. In either case, the subscriber device 108 operates in a complementary manner to decrypt the content.

In step 508, the AOI 220 transmits the encrypted content to the subscriber device over communication link 224. The subscriber device 108 can correctly decrypt the content if and only if a shared secret has successfully been determined. The AOI 220 may use protocols that inhibit transmission of protected content to the subscriber device if no shared secret has been determined.

It will be apparent to those skilled in the art that many modifications and variations may be made to the preferred embodiments of the present disclosure, as set forth above, without departing substantially from the principles of the present disclosure. All such modifications and variations are intended to be included herein within the scope of the present disclosure, as defined in the claims that follow.

What is claimed is:

1. A settop terminal in a subscriber television system, the settop terminal comprising:
    a first memory including an encrypted first key and an encrypted device key set stored therein;
    a secure element including a processor and a second memory, wherein the second memory is accessible only to the processor and has a private-key of a private-key/public-key pair stored therein, wherein the processor is adapted to decrypt the encrypted first key using the private-key, and wherein the decrypted first key is used to decrypt the encrypted device key set; and
    an adaptive output interface adapted to utilize a device key set to determine a shared-secret key with a receiver in communication therewith and adapted to provide an encrypted stream of content to the receiver using the shared-secret key to encrypt the stream of content.

2. The settop terminal of claim 1, wherein the device key set is used with protocols for high-bandwidth digital content protection.

3. The settop terminal of claim 1, wherein the device key set is used with protocols for digital transmission content protection.

4. The settop terminal of claim 1, wherein the adaptive output interface includes at least one of a digital visual interface and a High-Definition Multimedia Interface [HDMI].

5. The settop terminal of claim 1, wherein the output interface includes an IEEE 1394 interface.

6. The settop terminal of claim 1, further including: a second processor adapted to receive the decrypted first key and decrypt the encrypted device key set using the decrypted first key and provide the decrypted device key set to the adaptive output interface.

7. The settop terminal of claim 6, wherein second processor implements a symmetric cryptographic algorithm using the device-key set decryptor as a key to decrypt the encrypted device-key set.

8. The settop terminal of claim 7, wherein the symmetric cryptographic algorithm is a 3DES algorithm.

9. The settop terminal of claim 7, wherein the symmetric cryptographic algorithm is a DES algorithm.

10. The settop terminal of claim 1, wherein the encrypted device key set and the encrypted first key are stored in the first memory prior to installing the settop terminal in the subscriber television system.

11. In a subscriber television system including a headend in communication with a plurality of settop terminals including a given settop terminal, the given settop terminal comprising:
    a first memory including an encrypted first key and an encrypted device key set stored therein;
    a secure element including a first processor and a second memory, wherein the second memory is accessible only to the first processor and has a private-key of a private-key/public-key pair stored therein, wherein the first processor is adapted to decrypt the encrypted first key using the private-key;

an input port receiving a stream of content from the headend;

a second processor adapted to determine from the stream of content whether the content of the stream of content is protected and adapted to receive the decrypted first key and decrypt the encrypted device key set using the decrypted first key; and an adaptive output interface adapted to implement the decrypted device key set to determine a shared-secret key with a receiver in communication therewith and, responsive to the first processor determining the content is protected, adapted to provide an encrypted stream of content to the receiver using the shared-secret key to encrypt the stream of content, and, responsive to the first processor determining the content is not protected, adapted to provide the stream of content to the receiver.

12. The settop terminal of claim 11, wherein the device key set is used with protocols for high-bandwidth digital content protection.

13. The settop terminal of claim 11, wherein device key set is used with protocols for digital transmission content protection.

14. The settop terminal of claim 11, wherein the adaptive output interface includes at least one of a digital visual interface and a High-Definition Multimedia Interface [HDMI].

15. The settop terminal of claim 11, wherein the output interface includes an IEEE 1394 interface.

16. A method of providing a receiver with a stream of content, the method implemented in a settop terminal in a subscriber television system, the method comprising the steps of:

decrypting an encrypted first key using a private-key of a private-key/public-key pair belonging to the settop terminal, wherein the first key is decrypted inside of a secure-element including a processor and a memory, wherein the private-key is accessible to only the processor;

decrypting an encrypted device key set using the decrypted first key;

providing the decrypted device key set to an adaptive output interface of the settop terminal that is in communication with the receiver;

determining a shared-secret key with the receiver using the decrypted device key set; and outputting the stream of content to the receiver.

17. The method of claim 16, prior to the step of outputting, further including the steps of:

determining whether the content of the stream of content is protected content; and responsive to determining the content is protected, encrypting the content of the stream of content using the shared-secret key, wherein the output stream of content is encrypted.

18. The method of claim 17, prior to the step of encrypting the content, further including the steps of:

receiving a second encrypted stream of content; and decrypting the second stream of content, wherein the decrypted second stream of content is the stream of content that is encrypted in the encryption step.

19. A method of providing a receiver with a stream of content, the method implemented in a settop terminal in a subscriber television system, the method comprising the steps of:

decrypting an encrypted first key using a private-key of a private-key/public-key pair belonging to the settop terminal, wherein the first key is decrypted inside of a secure-element including a processor and a memory, wherein the memory is accessible to only the processor and has the private-key stored therein;

decrypting an encrypted device key set using the decrypted first key;

providing the decrypted device key set to an adaptive output interface;

negotiating a shared-secret key with the receiver using the decrypted device key set;

receiving a stream of content from a headend of the subscriber television system;

determining whether the receiver is entitled to access the stream of content;

determining whether the received stream of content is encrypted content; and outputting the stream of content to the receiver.

20. The method of claim 19, prior to the step of outputting, further including the steps of:

determining whether the content of the stream of content is protected content; and responsive to determining the content is protected, encrypting the content of the stream of content using the shared-secret key, wherein the output stream of content is encrypted.

21. The settop terminal of claim 1, wherein the memory of the secure element further includes a message private key stored therein that is separate from the private-key, wherein the processor of the secure element is further adapted to decrypt data within entitlement management messages (EMM) provided by a headend of the subscriber television system to the settop terminal using the message private key.

22. The settop terminal of claim 11, wherein the memory of the secure element further includes a message private key stored therein that is separate from the private-key, wherein the processor of the secure element is further adapted to decrypt data within entitlement management messages (EMM) provided by the headend of the subscriber television system to the settop terminal using the message private key.

23. The method of claim 16, further comprising:

providing an entitlement management message (EMM) from a headend of the subscriber television system to the settop terminal; and decrypting data within the entitlement management message (EMM) using a message private key stored within the memory of the secure-element, wherein the message private key is separate from the private-key.

24. The method of claim 19, further comprising:

providing an entitlement management message (EMM) from the headend of the subscriber television system to the settop terminal; and decrypting data within the entitlement management message (EMM) using a message private key stored within the memory of the secure-element, wherein the message private key is separate from the private-key.

* * * * *